J. R. LONGSTREET.
BATTERY WATER REPLENISHING DEVICE.
APPLICATION FILED DEC. 10, 1920.
1,383,411. Patented July 5, 1921.
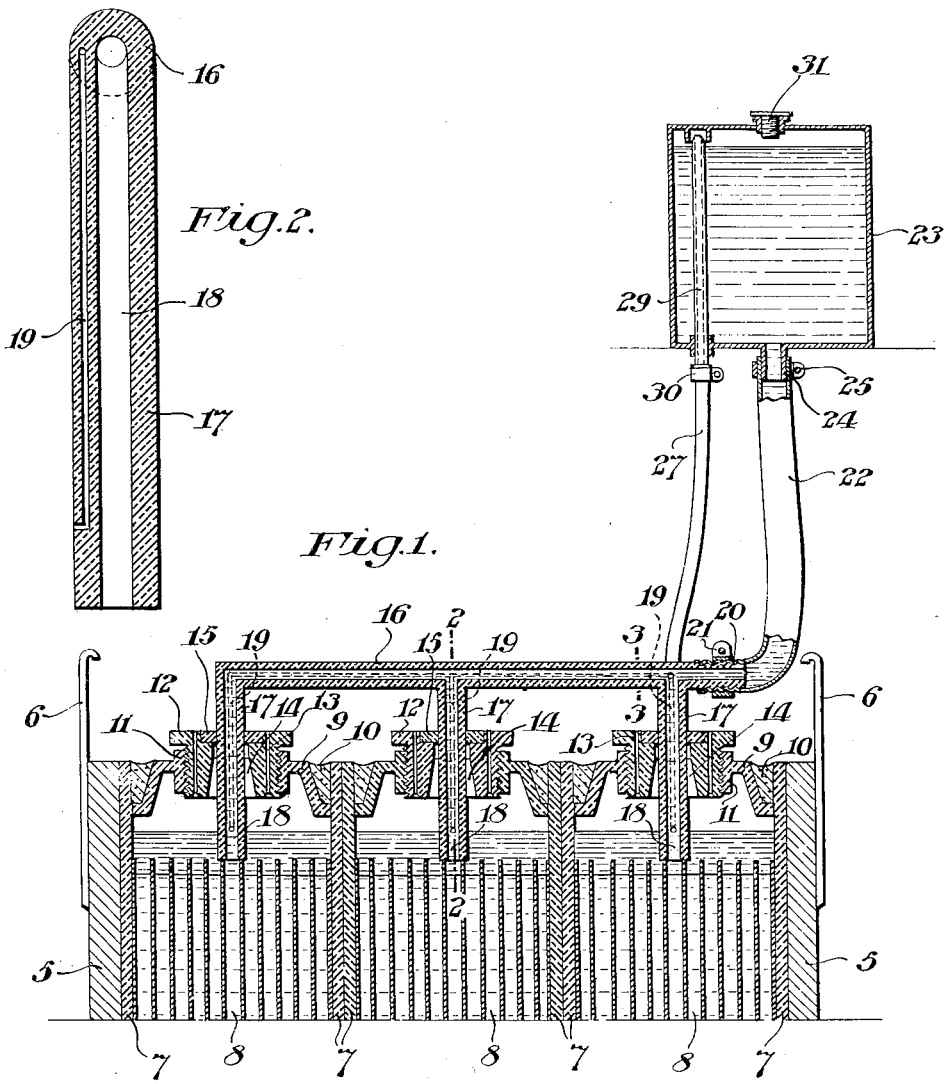
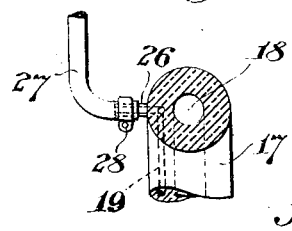
Inventor:
James Russell Longstreet,
By Jas. C. Wobensmith
Attorney.

UNITED STATES PATENT OFFICE.

JAMES RUSSELL LONGSTREET, OF PHILADELPHIA, PENNSYLVANIA.

BATTERY-WATER-REPLENISHING DEVICE.

1,383,411.   Specification of Letters Patent.   Patented July 5, 1921.

Application filed December 10, 1920. Serial No. 429,663.

*To all whom it may concern:*

Be it known that I, JAMES RUSSELL LONGSTREET, a citizen of the United States, residing at Philadelphia, in the county of Philadelphia and State of Pennsylvania, have invented certain new and useful Improvements in Battery-Water-Replenishing Devices, of which the following is a specification.

My invention relates to battery water replenishing devices, and it has particular relation to apparatus adapted to be used in connection with electric storage batteries of ordinary type for automatically maintaining the proper level of the electrolyte in each of the cells thereof, whereby the same will require a minimum of attention on the part of the user.

It is well known that for the efficient operation of electric storage batteries, it is requisite that a fairly constant level of the electrolyte be maintained in each cell of the battery, because on the one hand, if the level be permitted to fall below the top of the plates of the battery, the same will be quickly ruined by burning dry or sulfating, or, on the other hand, if too much water be placed therein, the electrolyte may be caused to escape through the vent caps, and in this manner leak over the top, resulting in short-circuiting, deterioration of the casing and corrosion of the connecting terminals. At the present time, there are large numbers of electric storage batteries used by persons having inadequate knowledge of the necessity of maintaining the proper level of the electrolyte, or, even when acquainted therewith, lacking the requisite skill to replenish in proper quantity, the water which naturally evaporates during the functioning of the battery.

The object, therefore, of the present invention is to provide means adapted to be used in connection with storage batteries of ordinary types which will automatically maintain the electrolyte in each cell of the battery at a constant level, which device will be simple and efficient, yet relatively inexpensive.

The nature and characteristic features of my invention will be more readily understood from the following description taken in connection with the accompanying drawings forming part hereof, in which—

Figure 1 is a vertical longitudinal sectional view of an electric storage battery of the type commonly used in automobiles, with the device embodying the main features of my present invention shown in connection therewith;

Fig. 2 is an enlarged sectional detail view taken approximately on the line 2—2 of Fig. 1; and Fig. 3 is a similar view taken approximately on the line 3—3 of Fig. 1.

Referring to the drawings, 5 is the wooden casing of an automobile storage battery of the usual type, having the usual carrying handles 6 extending upwardly therefrom at each end of the battery. Within the casing 5 are arranged the hard rubber jars 7 of the several cells of the battery. Within the jars the battery plates 8 are located. Mounted in the top of each jar is a cover plate 9, the side margins of which extend downwardly and then outwardly to contact with the inner surface of the jaws, forming, in connection with the top portions of the walls of the jar, a channel in which the sealing compound 10 is placed so as to hermetically seal the cover plate 9 to the jar 7. The cover plate 9 is provided with a threaded opening 11 in which a complementally threaded vent cap 12 is mounted, said vent cap 12 having vents 13 extending therethrough to permit escape of gases during the functioning of the battery. The foregoing parts are usually found in all of the storage batteries at present in common use in automobile practice.

In order to apply the device of the present invention to a battery of this type, each of the vent caps 12 is provided with a central aperture 14 extending therethrough, and each cap is also provided with a washer 15 at the upper end of the vent cap, for a purpose to be presently explained. 16 is a manifold having a horizontal portion and a plurality of branches 17, one for each cell of the battery, and so positioned with respect to each other as to extend through the apertures 14 in each of the vent caps 12, the washers 15 serving to close the top of the aperture around the branch 17 which extends therethrough. The branches 17 extend to a point within the cell just above the tops of the plates 8, being positioned by having their lower ends resting on the tops of the separators.

The manifold 16 is provided with two passageways, namely, a passageway 18 to permit the replenishing water to flow to the interior of the cells through the branches 17, and a passageway 19 relatively smaller, extending from a point in the side wall of each branch 17 at a distance above the lower end thereof, corresponding to the level of the electrolyte to be maintained above the top of the plates of the cell. The passageway 18 extends to a nipple 20 at one end of the horizontal portion of the manifold 16, and has attached thereto, by means of a suitable clamping band 21, a pipe or hose 22 which extends to a reservoir 23, being connected to a nipple 24 thereof by means of a clamping band 25. The reservoir 23 is preferably made of hard rubber or other material such that no chemical action will take place in the distilled water which is adapted to be maintained therein for the purpose of replenishing the electrolyte in the battery.

The passageway 19 extends to a point adjacent the nipple 20 and terminates in a sidewise extending nipple 26, to which a pipe or hose 27 is attached by means of a suitable clamping band 28. The pipe or hose 27 extends and is connected to the lower end of a vertical pipe 29, being attached thereto by means of a clamping band 30. The vertical pipe 29 is preferably made of hard rubber or other suitable material, and extends through the bottom of the reservoir 23, thence upwardly through the interior of said reservoir, and terminating near the top thereof. The reservoir 23 is normally closed to the atmosphere, but access may be had thereto by means of a threaded plug 31 mounted in the top thereof for the purpose of refilling the same with the distilled water when required.

The operation of the device may now be readily understood. As before stated, the lower ends of the branches 17 terminate near the tops of the plates of the respective cells of the battery. The outlet of the passageway 19 in each of the branches 17, as before stated, is located at a point approximately that of the level of the electrolyte to be maintained in each cell. Consequently, when the level of the electrolyte falls below the outlet of the passageway 19, a quantity of air will be permitted to pass through said passageway, thence through the pipe or hose 27 and the upright pipe 29 mounted in the reservoir 23, and thus pass to the interior of said reservoir, preferably above the level of the distilled water maintained therein. In this manner, a quantity of water will be permitted to flow from the reservoir 23 through the pipe 22, thence through the manifold 16 and through the branch 17 to the particular cell of the battery in which the level of the electrolyte has fallen, and said water will continue to flow until the level is raised sufficiently to close the outlet of the passageway 19, and thus prevent the entrance of air to the reservoir 23 to stop passage of any further quantity of water therefrom.

It will be seen that there is thus provided simple and efficient apparatus which may be readily attached to the various types of storage batteries at present in common use, which is also characterized by the feature that the same requires no additional head room over the top of the battery other than is usually provided for the carrying handles of the battery, and which is also characterized by the fact that the same may be readily attached to the battery without radical change in the construction thereof, and which may be used by persons of ordinary knowledge, with a minimum of attention.

Having thus described the nature and characteristic features of my invention, what I claim as new and desire to secure by Letters Patent, is:

1. The combination with an electric storage battery in which a constant level of electrolyte is to be maintained, of a vent cap having an aperture extending therethrough, a device having a branch extending through said aperture in said vent cap, said device having a passageway for liquid extending through said branch, and a separate passageway for air having an outlet in said branch located at the level of the fluid to be maintained in said battery, a closed reservoir adapted to contain the replenishing fluid, a pipe or hose connecting the liquid passageway to the bottom of said reservoir, and a separate pipe or hose connecting the air passageway to said reservoir.

2. The combination with an electric storage battery consisting of a plurality of cells, in each of which a constant level of electrolyte is to be maintained, of a manifold having a plurality of branches respectively extending into said cells, said manifold having a passageway for liquid extending through each of said branches and a separate passageway for air having an outlet in each of said branches located at the level of the fluid to be maintained in each of said cells, a closed reservoir adapted to contain the replenishing fluid, and connections extending from said manifold to said reservoir.

3. The combination with an electric storage battery consisting of a plurality of cells, in each of which a constant level of electrolyte is to be maintained, of a manifold having a plurality of branches respectively extending into said cells, said manifold having a passageway for liquid extending through each of said branches and a separate passageway for air having an outlet in each of said branches located at the level of the fluid to be maintained in each of said cells, a closed reservoir adapted to contain the replenishing fluid, a pipe or hose connecting the liquid passageway of the manifold to the bottom of said reservoir, and a separate pipe or hose connecting the air passageway of the manifold to said reservoir, 4. The combination with an electric storage battery consisting of a plurality of cells, in each of which a constant level of electrolyte is to be maintained, of a vent cap for each of said cells having an aperture extending therethrough, a manifold having a plurality of branches respectively extending through said apertures in said vent caps, said manifold having a passageway for liquid extending through each of said branches and a separate passageway for air having an outlet in each of said branches located at the level of the fluid to be maintained in each of said cells, a closed reservoir adapted to contain the replenishing fluid, and connections extending from said manifold to said reservoir.

5. The combination with an electric storage battery consisting of a plurality of cells, in each of which a constant level of electrolyte is to be maintained, of a vent cap for each of said cells having an aperture extending therethrough, a manifold having a plurality of branches respectively extending through said apertures in said vent caps, said manifold having a passageway for liquid extending through each of said branches, and a separate passageway for air having an outlet in each of said branches located at the level of the fluid to be maintained in each of said cells, a closed reservoir adapted to contain the replenishing fluid, a pipe or hose connecting the liquid passageway of the manifold to the bottom of said reservoir, and a separate pipe or hose connecting the air passageway of the manifold to said reservoir.

In testimony whereof, I have hereunto signed my name.

JAMES RUSSELL LONGSTREET.